United States Patent [19]
Schubert et al.

[11] Patent Number: 5,138,484
[45] Date of Patent: Aug. 11, 1992

[54] MIRROR TELESCOPE

[75] Inventors: Hermann Schubert, Ballmertshofen; Hans-Joachim Juranek, Aalen-Waldhausen, both of Fed. Rep. of Germany

[73] Assignee: Carl-Zeiss-Stiftung, Heidenheim, Fed. Rep. of Germany

[21] Appl. No.: 624,598

[22] Filed: Dec. 10, 1990

[30] Foreign Application Priority Data

Dec. 12, 1989 [DE] Fed. Rep. of Germany ....... 3940924

[51] Int. Cl.$^5$ ............................................. G02B 23/00
[52] U.S. Cl. .................................. 359/350; 359/399; 359/846; 250/330
[58] Field of Search ................. 350/1.1, 1.5, 537, 607, 350/609, 619, 620, 568; 378/43; 250/330; 356/138; 359/350, 399, 846

[56] References Cited

U.S. PATENT DOCUMENTS

| | | | |
|---|---|---|---|
| 4,494,819 | 1/1985 | Lidwell | 350/1.1 |
| 4,521,068 | 6/1985 | Schulte | 350/1.1 |
| 4,624,538 | 11/1986 | MacFarlane | 350/1.1 |
| 4,649,274 | 3/1987 | Hartmann | 250/341 |
| 4,991,948 | 2/1991 | Hugenell | 350/568 |
| 5,016,265 | 5/1991 | Hoover | 378/43 |

FOREIGN PATENT DOCUMENTS

| | | |
|---|---|---|
| 0315030 | 5/1989 | European Pat. Off. |
| 2449380 | 9/1980 | France |
| WO87/05451 | 9/1987 | World Int. Prop. O. |

*Primary Examiner*—Rodney B. Bovernick
*Assistant Examiner*—J. P. Ryan
*Attorney, Agent, or Firm*—Walter Ottesen

[57] ABSTRACT

The invention relates to a mirror telescope for use in inaccessible assemblies such as in satellites. The primary mirror and the secondary mirror are made of the same material as are all components which fix and influence the distance. In this way, a mirror telescope is provided which maintains its optical characteristics without readjustment over a long period of time.

11 Claims, 2 Drawing Sheets

MIRROR TELESCOPE

FIELD OF THE INVENTION

The invention relates to a mirror telescope having a primary mirror and a secondary mirror with the spacing of the two mirrors being fixed by a tube and with the secondary mirror being disposed in the front ring.

BACKGROUND OF THE INVENTION

Mirror telescopes have aplanatic mirror systems and are sometimes referred to as coma-free reflecting telescopes. They are used primarily for astro-photographic purposes and are characterized by satisfying the sine condition whereby a larger image field is coma-free. A concave mirror or a composite mirror system functions as an objective in mirror telescopes. The primary mirror is configured as a parabolic mirror to avoid spherical aberration. An important advantage of the mirror telescopes is the absence of chromatic aberration. Mirror telescopes can be produced with far greater objective diameters than refracting telescopes and the aperture ratio can be substantially larger because of the absence of the residual defects on the optical axis. Such residual defects include secondary spectrum and aperture aberrations.

A disadvantage of the mirror telescopes is their high sensitivity with respect to adjustment. This is especially the case when the optical quality must be maintained over several years without refocusing and be independent of temperature changes, vibration load and material aging. These requirement apply, for example, to the use in unaccessible assembly groups such as in satellites.

SUMMARY OF THE INVENTION

It is an object of the invention to provide a mirror telescope which retains its optical quality over several years without refocusing. Accordingly, it is a further object of the invention to provide such a mirror telescope which does not require a heavy and voluminous refocusing apparatus with which a specific failure probability is necessarily associated.

The mirror telescope of the invention includes: a primary mirror defining an optical axis; a secondary mirror arranged on the axis in spaced relationship to the primary mirror; a tube for accommodating the mirrors thereon and for determining the spacing between the mirrors; and, the mirrors and the tube all being made of the same material.

By manufacturing the mirror as well as the components fixing the distance of the same material, the condition is obtained that all optical characteristics (such as the position of the focus to a first approximation) are maintained notwithstanding possible geometric overall changes because of external influences. In this way, the necessity of refocusing is eliminated. The assembly of the mirror telescope is advantageously undertaken with the least possible number of components in order that these overall changes are held as small as possible.

Zerodur is an especially suitable material and has a low weight (2.7 grams per cm$^3$). This material has been shown to be especially useful as a mirror material and has a low thermal coefficient of expansion.

The minimum number of components results from the mirror telescope system which is utilized. A mirror telescope of Cassegrain affords the special advantage of having a very short overall length. If a telescope of this kind is utilized, then at least the following components are required: a primary mirror having a supporting structure, a tube, a front ring having a spider and a secondary mirror mount and a secondary mirror as mechanical components as well as an ocular as an assembly group. A further minimization of the components is achieved if the front ring is manufactured directly with the secondary mirror. This production is more difficult from a manufacturing point of view but reduces the number of components and avoids especially the relatively difficult attachment of the secondary mirror to the secondary mirror mount of the front ring.

The parts are advantageously joined to each other with cement after the parts are adjusted with respect to each other. The parts should be cemented next to the mechanical points of contact in order not to decrease the effectiveness of the adjustment.

The telescope of the invention can operate advantageously as an optical transmitting and receiving antenna. The transition from microwaves to infrared waves for data transmission affords several advantages, namely: a smaller construction of the antenna; a higher transmission rate; and, a reduced consumption of energy during transmitting operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
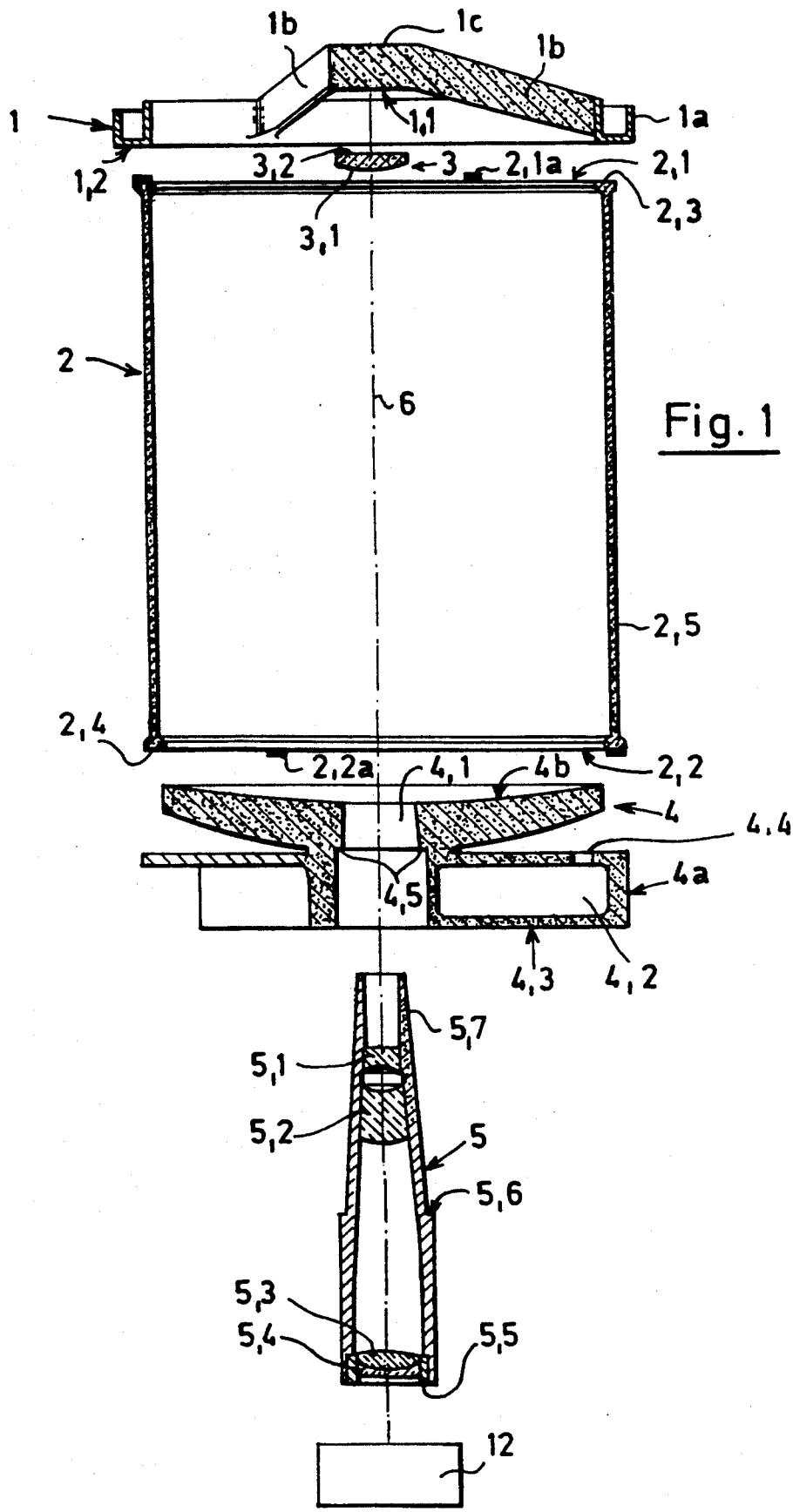
FIG. 1 is a schematic, partially in section, of a mirror telescope of the invention having five individual parts; and, FIG. 2 is a schematic, partially in section, of another embodiment of the mirror telescope of the invention shown assembled and having four individual parts.

The mirror telescope in FIG. 1 is shown as an exploded view shown in elevation. The principal features in this configuration of the mirror telescope are the following: a very high optical quality of imaging without refocusing even after several years; a short overall assembly length; and, the least possible weight with adequate strength especially with respect to tensile stress.

The mirror telescope includes a front ring 1 which is mounted on a tube 2. The front ring 1 has a peripheral U-shaped circular ring 1a which is open in the upper direction. The U-shaped circular ring has an inner circular ring wall which extends somewhat higher than its outer circular ring wall. The side walls of the circular ring 1a all have the same wall thickness. Three spiders 1b are mounted on the inner side of the circular ring and are directed inwardly. The contact faces of the spiders become somewhat wider at the inner side of the annular ring facing inwardly and are provided for stability reasons. The wall thickness of the spider 1b corresponds to the wall thickness of the annular member 1a. The spiders 1b are at an angle of inclination α relative to the base surface of the annular member 1a of approximately 15°. The width of the spiders 1b is almost the same over their entire length.

A secondary mirror mount 1c is disposed in the center of the annular member 1a and is held by the spiders 1b. The secondary mirror mount 1c is made of a massive round material block having a diameter somewhat less than the diameter of the secondary mirror 3. The spiders 1b are configured so that the secondary mirror 3 can nonetheless be attached to the secondary mirror mount 1c. For this purpose, the spiders 1b are so configured that they first extend horizontally from the secondary mirror mount 1c and bend only when adequate space is available around the secondary mirror mount 1c for the attachment of the secondary mirror. The lower end 1.1 of the secondary mirror mount is somewhat higher than the upper edge of the circular member 1a by an amount that the lower end 3.1 of the secondary mirror 3 closes precisely with the upper edge of the inner circular ring 1a when the secondary mirror 3 is mounted with its planar upper face 3.2 on the planar lower end 1.1 of the secondary mirror mount 1c. The secondary mirror 3 is then so aligned that its optical axis 6 coincides precisely with the surface normal of the lower end 1.2 of the circular ring 1a.

The front ring 1 with the secondary mirror 3 mounted therein is then seated on the tube 2. The two circular rings (2.1, 2.2) are disposed on the tube 2. The circular rings (2.1, 2.2) are configured to be thickened. The first circular ring 2.1 has three contact faces or contact points 2.1a and the second circular ring 2.2 likewise has three contact faces or contact points 2.2a. The contact faces 2.1a disposed at the upper end 2.1 of the tube 2 function as mechanical contact points 2.1a for the front ring 1. After all parts of the telescope are aligned with respect to each other, the tube 2 is cemented to the front ring 1 with a suitable cement by filling the intermediate space between the three contact faces 2.1a.

The tube 2 is a hollow cylinder having annular faces (2.3, 2.4) on which the two sets of three contact faces (2.1a, 2.2a) are mounted. The wall thickness of the lateral enclosure 2.5 then corresponds to the wall thickness of the sides of the circular member 1a.

The lower contact faces 2.2a of the tube 2 act as contact points 2.2a for the base plate 4. After alignment, the intermediate space between the contact points 2.2a are filled with a suitable cement thereby fixing the base plate 4 relative to the tube.

The base plate 4 comprises a support structure 4a and a primary mirror 4b with both having an adequately large opening 4.1 for the ocular 5 which is to be placed later. A seat 4.5 is formed in the bore 4.1 in order to limit the movement of the ocular 5 in the interior of the tube 2. The support structure 4a below the primary mirror 4b comprises three hollow bodies 4.2 arranged in a circle with the hollow bodies 4.2 being equally spaced one from the other. The surface normal of the lower surface 4.3 of the hollow bodies 4.2 coincides with the optical axis 6. The hollow bodies 4.2 have respective venting bores 4.4 at their respective upper ends.

The ocular 5 has several lenses (5.1, 5.2, 5.3, 5.4). Furthermore, the casing 5.7 has a seat 5.6 which corresponds to the seat 4.5 of the opening 4.1 of the base plate 4. After both forward lenses (5.1, 5.2) are attached in the ocular 5, the two rear lenses (5.3, 5.4) are inserted in a separate mount 5.5 into the ocular 5 and fixed. Thereafter, the ocular 5 is inserted into the opening 4.1 of the base plate 4 until the two seats (5.6, 4.5) are in contact engagement with each other. The ocular 5 is then fixed in the opening with a suitable cement.

All parts of the telescope (1, 2, 3, 4, 5) are manufactured of the same material. Only the lenses (5.1 to 5.4) of the ocular 5 must be made of a material which is transparent for the wavelengths used. Zerodur is especially suitable as a material for the parts (1, 2, 3, 4, 5) of the telescope. The material Zerodur offers special advantages because of its low specific weight (2.7 gr/cm$^3$) and its minimal temperature expansion coefficient. The Zerodur should all come from the same charge.

During assembly of the telescope, the secondary mirror 3 is first aligned on the secondary mirror mount 1c of the front ring 1 and attached. Thereafter, the secondary mirror 3 is aligned relative to the primary mirror 4b by means of a polishing adjustment and then cemented. The front ring 1 having the secondary mirror 3 mounted therein is adjusted in the 0.1 $\mu$m region to base plate 4 having the primary mirror 4b. This adjustment is performed at the three raised contact faces (2.1a, 2.2a) at the respective ends (2.1, 2.2) of the tube 2 by means of lapping. This makes it possible to maintain the permissible spacing tolerance between the primary mirror 4b and the secondary mirror 3 caused, for example, by thermal influences or by a shock to less than 2 $\mu$m. After the adjustment is completed, the region between the raised contact faces (2.1a, 2.2a) is filled out with a suitable cement. The suitability of a cement for this purpose is seen in a coefficient of thermal expansion which is adapted to the parts (1, 2, 3, 4, 5) of the telescope and in a good resistance of the cement to aging. Finally, the ocular 5 is inserted in the opening 4.1 of the base plate 4. In this connection, attention must be given to the fact that a bundle of parallel incoming rays of the telescope leave the ocular 5 also as a bundle of parallel output rays.

The telescope shown in FIG. 1 has a main mirror diameter of approximately 250 mm, an overall diameter of approxhmately 310 mm and an overall length of approximately 450 mm in the assembled condition with a weight of less 8.5 kg. The telescope is especially suitable as an antenna/transmitter for an optical telecommunication system in space. The very high requirements as to the adjustment of the parts (1, 2, 3, 4, 5) of the telescope result from this condition and this adjustment must continue over at least ten years without refocusing. The Cassegrain system used in the telescope has the ocular 5 and affords the very short assembly configuration which leads to a significant savings in weight. The aperture of the primary mirror is 1:1.5.

An optical receiving and transmitting device 12 is arranged behind the ocular 5 in accordance with the known state of the art. This optical receiver and transmitter device 12 is connected to parts of the system into which the telescope is built.

Figure 2:
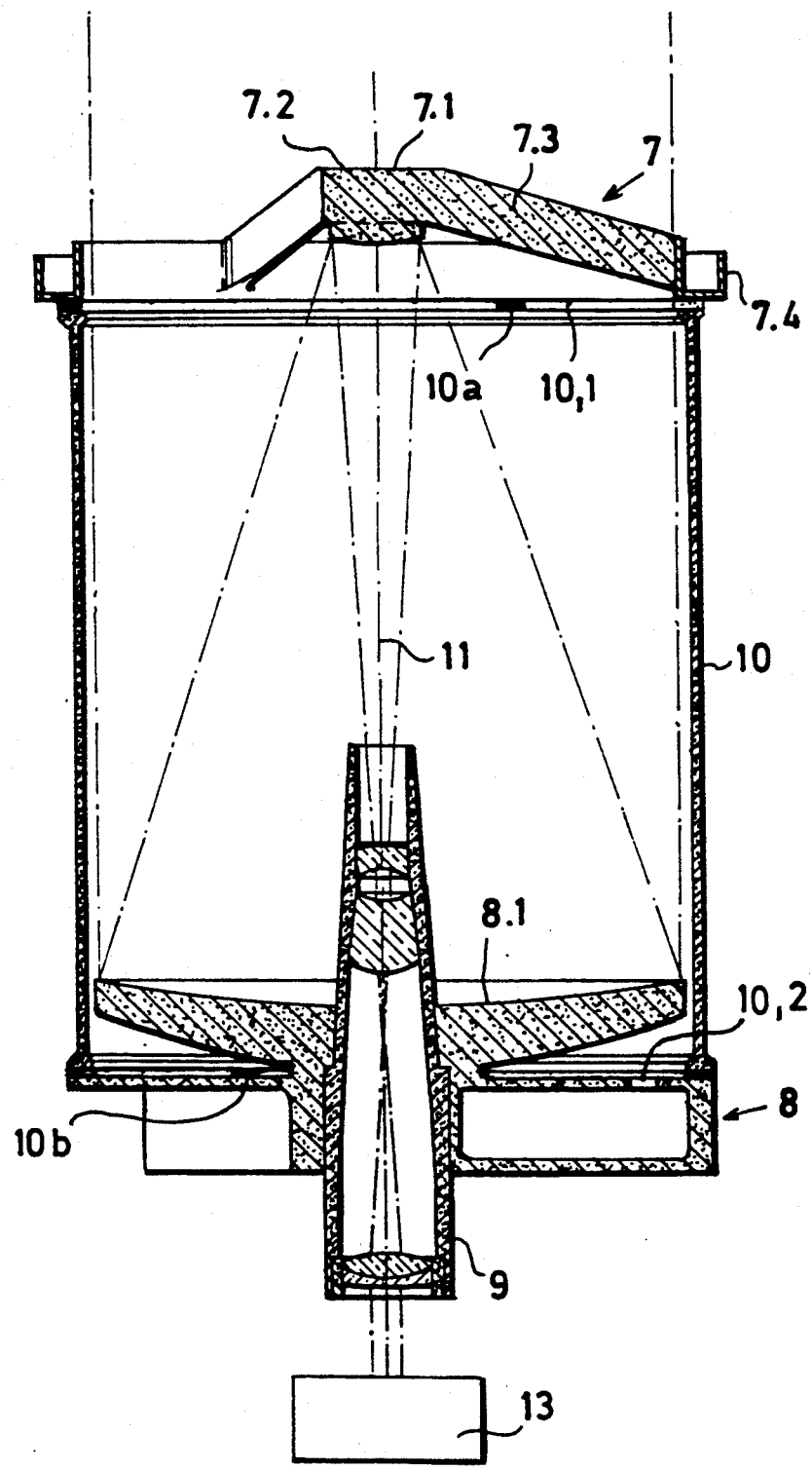

A second embodiment of the telescope of the invention is shown assembled in FIG. 2. In contrast to FIG. 1, the secondary mirror mount 7.1 and the secondary mirror 7.2 are configured as a monolithic front ring 7 together with the spiders 7.3 and the annular member 7.4. As in FIG. 1, this secondary mirror 7.2 has a convex hyperbolic form with one of its focal points coinciding with the focal point of the primary mirror 8.1. The second focal point of the secondary mirror 7.1 is disposed in the vicinity of the central bore of the main mirror 8.1 from which the ocular 9 projects outwardly. The secondary image can be viewed as an inverted image with the ocular 9. A real intermediate image is not present ahead of the ocular 9. In this telescope, the equivalent focal length of the composite system is greater than the focal length of the primary mirror 8.1 notwithstanding the short assembly length.

With the monolithic front ring 7 having the secondary mirror 7.1, the number of parts required to construct the telescope is reduced to three in addition to the ocular 9 as an assembly group. This solution which is more difficult with respect to manufacture leads to a reduction of the danger of a maladjustment and avoids the problems of attaching the secondary mirror 7.2 to the secondary mirror mount 7.1.

The intermediate spaces (10.1, 10.2) shown in FIG. 2 between the front ring 7 and the tube 10 as well as between the tube 10 and the base plate 8 are filled with cement. The intermediate spaces (10.1, 10.2) and the contact faces (10a, 10b) are shown enlarged in FIG. 2 for clarity. The beam path of the telescope is shown in FIG. 2 with the optical axis 11.

The telescope operates in the infrared range at approximately 825 nm. The transition from microwaves which are usually used to infrared waves leads to several advantages which include: smaller assembly, higher transmitting rate and therefore a transmission of more information per unit of time and a reduced energy consumption during transmission (milliwatts in lieu of watts). In this way, the telescope is especially suitable for transmitting in regions outside of the atmosphere. An optical receiving and transmitting device 13 in accordance with the state of the art is arranged behind the ocular 9 for carrying out the transmission and receiving of infrared signals. This device 13 is connected to other parts of the assembly which are not shown and into which the mirror telescope is built.

It is understood that the foregoing description is that of the preferred embodiments of the invention and that various changes and modifications may be made thereto without departing from the spirit and scope of the invention as defined in the appended claims.

What is claimed is:

1. A mirror telescope comprising:
   a primary mirror defining an optical axis;
   a secondary mirror arranged on said axis in spaced relationship to said primary mirror;
   a tube for accommodating said mirrors thereon and for determining the spacing between said mirrors; and,
   said mirrors and said tube all being made of the same material.

2. The mirror telescope of claim 1, further comprising a front ring having a secondary mirror mount formed thereon; a base plate incorporating said primary mirror; and, an ocular arranged along said axis;
   said tube; and, said base plate incorporating said primary mirror all being mechanical components; and,
   said ocular being an assembly of components.

3. The mirror telescope of claim 2, further comprising adhesive means for fixing said mechanical components and said assembly of components to each other with respect to their positions.

4. The mirror telescope of claim 3, said tube having first and second longitudinal ends; a first set of three mechanical contacts disposed on said first end of said tube and a second set of three mechanical contacts disposed on said second end of said tube; and, said sets of contacts being configured and arranged on said respective ends for fixing the spacing between said mirrors and for aligning said mirrors on said axis.

5. The mirror telescope of claim 2, further comprising an optical infrared sensitive receiving and transmitting means arranged behind said ocular.

6. The mirror telescope of claim 1, wherein said mirror telescope is configured as a Cassegrain system.

7. A mirror telescope comprising:
   a primary mirror defining an optical axis;
   a secondary mirror arranged on said axis in spaced relationship to said primary mirror;
   a tube for accommodating said mirrors thereon and for determining the spacing between said mirrors;
   said mirrors and said tube all being made of the same material;
   a front ring for mounting said secondary mirror on said tube; said front ring being made of the same material as said mirrors and said tube; and,
   said material being Zerodur.

8. A mirror telescope comprising:
   a primary mirror defining an optical axis;
   a secondary mirror arranged on said axis in spaced relationship to said primary mirror;
   a tube for accommodating said mirrors thereon and for determining the spacing between said mirrors;
   said mirrors and said tube all being made of the same material;
   a front ring having a secondary mirror mount formed thereon for accommodating said secondary mirror;
   a base plate incorporating said primary mirror; and, an ocular arranged along said axis;
   said tube; and, said base plate incorporating said primary mirror all being mechanical components;
   said ocular being an assembly of components; and,
   said front ring having said secondary mirror mount and said secondary mirror conjointly defining a single monolithic mechanical component.

9. A mirror telescope comprising:
   a primary mirror defining an optical axis;
   a secondary mirror arranged on said axis in spaced relationship to said primary mirror;
   a tube for accommodating said mirrors thereon and for determining the spacing between said mirrors;
   said mirror and said tube all being made of the same material;
   a front ring having a secondary mirror mount formed thereon for accommodating said secondary mirror;
   a base plate incorporating said primary mirror; and, an ocular arranged along said axis;
   said tube; and, said base plate incorporating said primary mirror all being mechanical components;
   said ocular being an assembly of components;
   adhesive means for fixing said mechanical components and said assembly of components to each other with respect to their positions;
   said tube having first and second longitudinal ends; a first set of three mechanical contacts disposed on said first end of said tube and a second set of three mechanical contacts disposed on said second end of said tube; and, said sets of contacts being configured and arranged on said respective ends for fixing the spacing between said mirrors and for aligning said mirrors on said axis; and,
   said first end of said tube defining a surface between each two mutually adjacent ones of said contacts of said first set and said second end of said tube defining a surface between each two mutually adjacent ones of said contacts of said second set; said front ring being mounted on said first set of contacts to conjointly define respective gaps with the surfaces of said first end; said base plate being mounted on said second set of contacts to conjointly define respective gaps with the surfaces of said second end; and, said adhesive means being disposed in said gaps.

10. A mirror telescope comprising:

a primary mirror defining an optical axis;
a secondary mirror arranged on said axis in spaced relationship to said primary mirror;
a tube for accommodating said mirrors thereon and for determining the spacing between said mirrors;
said mirrors and said tube all being made of the same material;
a front ring for mounting said secondary mirror on said tube; said front ring being made of the same material as said mirrors and said tube;
a base plate defining said primary mirror;
an ocular arranged along said axis;
said base plate being a single body made of said same material and mounted directly on said tube; and,
said ocular including a tube-like casing made of said same material and a plurality of lenses mounted in said casing along said axis.

11. The mirror telescope of claim 10, said material being Zerodur.

* * * * *

UNITED STATES PATENT AND TRADEMARK OFFICE
CERTIFICATE OF CORRECTION

PATENT NO. : 5,138,484
DATED : August 11, 1992
INVENTOR(S) : Hermann Schubert and Hans-Joachim Juranek It is certified that error appears in the above-identified patent and that said Letters Patent is hereby corrected as shown below:

In column 4, line 32: delete "approxhmately" and substitute -- approximately -- therefor.

In column 6, line 36: delete "mirror" and substitute -- mirrors -- therefor.

Signed and Sealed this

Fourteenth Day of September, 1993

Attest:

BRUCE LEHMAN

*Attesting Officer*    *Commissioner of Patents and Trademarks*